United States Patent [19]

Schiller et al.

[11] Patent Number: 5,287,664
[45] Date of Patent: Feb. 22, 1994

[54] METAL STUD INTERLOCKING CONDUIT STRAP

[76] Inventors: Reuben W. Schiller, 1612 S. 33rd, Temple, Tex. 76504; Valerian J. Schiller, Rte. 3, Box 3212, Belton, Tex. 76513

[21] Appl. No.: 967,435

[22] Filed: Oct. 28, 1992

[51] Int. Cl.$^5$ ............................................. E04B 1/38
[52] U.S. Cl. ................................. 52/220.1; 52/712; 52/745.21; 248/56
[58] Field of Search ............... 52/220.1, 712, 745.21; 174/48, 65 R; 248/56, 300, 248

[56] References Cited

U.S. PATENT DOCUMENTS

| | | | |
|---|---|---|---|
| 2,657,443 | 11/1953 | Hartman | 248/56 |
| 3,240,869 | 9/1964 | Jureit | 52/220.1 |
| 3,920,208 | 11/1975 | Dowdy et al. | 248/56 |
| 4,366,341 | 12/1982 | van Riet | 52/220.1 |
| 4,924,646 | 5/1990 | Marquardt | 512/220.1 |

OTHER PUBLICATIONS

1988 Erico Products, Inc. Caddy Fasteners for the construction industry product catalog, Pages: Front and Back Covers, 1, 2, and 64.

Primary Examiner—Carl D. Friedman
Assistant Examiner—Christopher T. Kent
Attorney, Agent, or Firm—Richards, Medlock & Andrews

[57] ABSTRACT

A conduit strap (10) is disclosed for installing a conduit (12) through an aperture (16) in a metal stud (14). The strap (10) will secure the conduit (12) in place without the use of any fasteners. The strap is installed by inserting a arm (26) through the aperture in the metal stud and then rotating the strap so that a portion of another arm (20) pass through the aperture and engages the back side of the stud to tightly secure the strap within the stud.

4 Claims, 1 Drawing Sheet

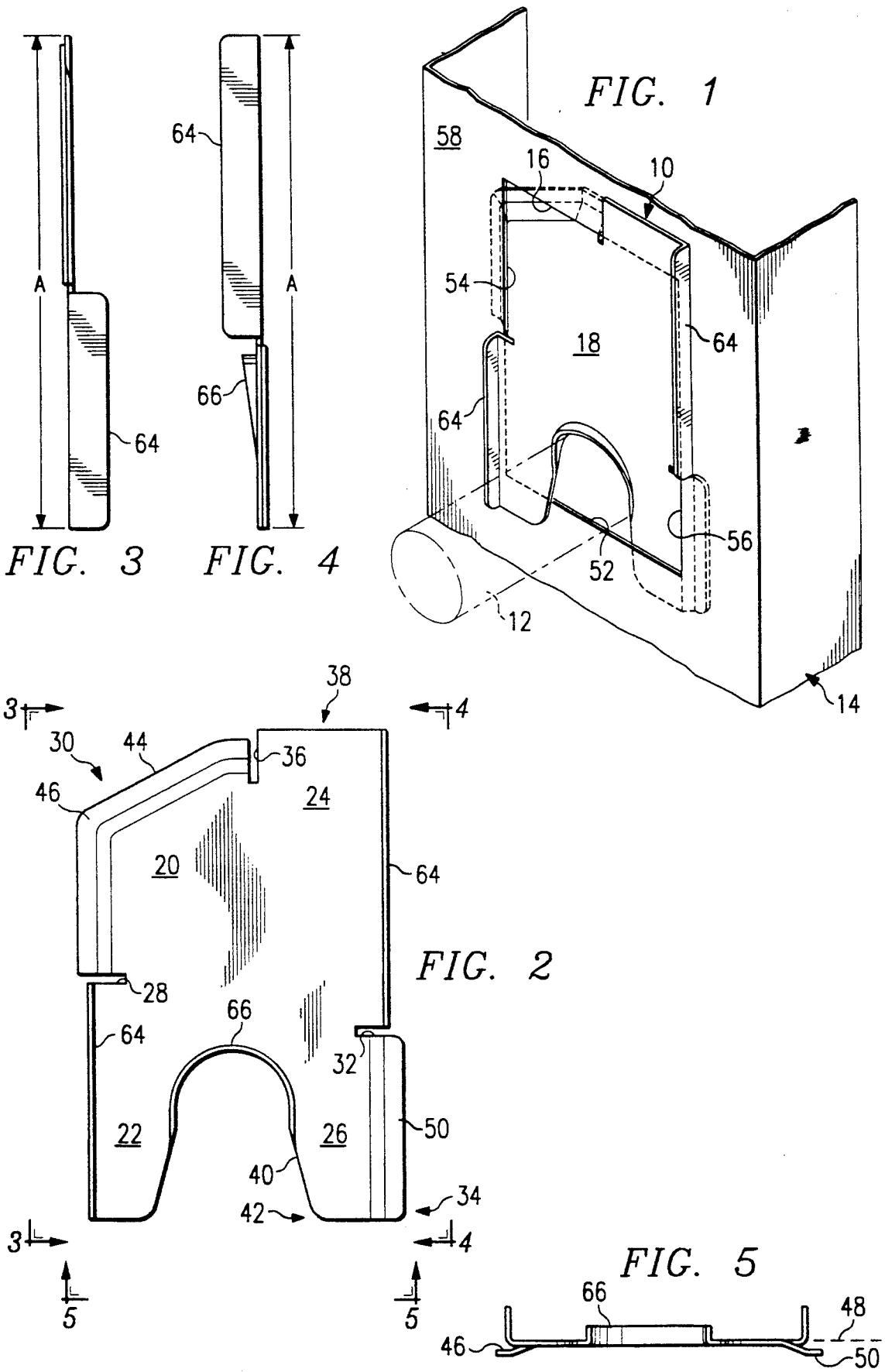

METAL STUD INTERLOCKING CONDUIT STRAP

TECHNICAL FIELD OF THE INVENTION

This invention relates to the installation of conduit in a metal stud, and particularly to a device to fasten the conduit to the metal stud.

BACKGROUND OF THE INVENTION

The metal two by four stud is commonly used in construction, particularly in building-out office space. Electrical conduits are run through the studs through rectangular square apertures in the studs. These conduits are commonly tied or secured to the studs to meet safety code regulations. Securing the conduit to the studs is time-consuming and labor intensive typically requiring one or more screws to be installed at each stud. It therefore adds to the cost of building construction.

Some attempts have been made to provide for more efficient attachment of a conduit passing through a stud. Erico Products, Inc., manufacturers of Caddy Fasteners, manufactures a through the stud conduit support which is an hanger intended to be secured to the stud by a single self-tapping screw. The support is similar to a hook with the conduit resting on the inside of the hook.

However, a more effective device is needed to attach conduit to studs than is presently available. This device should be inexpensive and easy to use and have a minimum of manual labor required.

SUMMARY OF THE INVENTION

In accordance with one aspect of the present invention, a conduit strap is disclosed for use with a metal stud. The metal stud has a rectangular aperture therethrough. The conduit strap includes a resilient plate with the plate having first, second, third and fourth arms. The first and second arms are disposed on a first side of the plate with a first notch formed in the plate between the first and second arms. The third and fourth arms are disposed on a second side of the plate with a second notch formed in the plate between the third and fourth arms. The first arm has a beveled edge permitting the plate to be positioned with the second and third arms on the front side of the stud and the fourth arm on the back side of the stud and rotated to engage the first arm on the back side of the stud and secure the strap to the stud.

In accordance with another aspect of the present invention, a cutout is formed in the plate between the second and fourth arms to receive the conduit. In another feature, the second and third arms define extensions for engaging the plate to rotate it into the engaged position with the stud.

BRIEF DESCRIPTION OF THE DRAWINGS

For a more complete understanding of the present invention an for further advantages thereof, reference is now made to the following description to the preferred embodiment taken in conjunction with the accompanying drawings in which:

FIG. 1 is a perspective view of a strap forming a first embodiment of the present invention installed in a metal stud;

FIG. 2 is plan view of the strap;

FIG. 3 is a side view of the strap taken along line 3—3 in FIG. 2;

FIG. 4 is a side view of the strap taken along line 4—4 in FIG. 2;

FIG. 5 is a end view of the strap taken along the line 5—5 of FIG. 2.

DETAILED DESCRIPTION

Referring to FIGS. 1-5, there is shown a conduit strap 10 forming a first embodiment of the present invention. The strap 10 is designed to secure conduit 12 to a metal stud 14 as the conduit 12 passes through a rectangular aperture 16 formed through the stud.

The conduit 12 will typically carry electrical power conductors, but can also carry telephone lines, intercom lines, fiber optic lines and the like. As noted previously, it is desirable, as well as being required by certain construction codes, to secure the conduit to the stud where it passes through the stud. The conduit strap 10 achieves this result with minimum cost and maximum efficiency, as will be described hereinafter.

The strap 10 is formed of a flexible plate 18 which can comprise any suitable material which will achieve the result desired. Such materials would include steel, galvanized steel, stainless steel, brass, copper and bronze, as well as many plastics.

The plate 18 can be seen to define a first arm 20, a second arm 22, a third arm 24 and a fourth arm 26. A notch 28 is formed between the first and second arms on a first side 30 of the plate. A notch 32 is formed between the third and fourth arms on a second side 34 of the plate. Similarly, a notch 36 separates the first and third arms at the top 38 of the plate while a cutout 40 separates the second and fourth arms at the bottom 42 of the plate. As best seen in FIG. 2, the first arm has a beveled edge 44 which extends from notch 36 to the first side. In addition, the first arm has a lip 46 which extends below the plane 48 of the plate. The fourth arm has a similar lip 50 which also extends below the plane 48. In installation, the conduit is first placed through the metal stud 14 and is positioned to engage the lower edge 52 of the aperture 16 about half way between the side edges 54 and 56 of the aperture. The strap is installed in the stud from the front side 58 of the stud by tilting the strap about 30 degrees clockwise from its installed position and slipping the lip 50 through the aperture to engage the back side 60 of the stud with the conduit received in the cutout 40. In this position, the notch 32 is fit over the side edge 56. In this position also, the lip 46 can pass through the aperture because of the beveling 44 and, as the strap is rotated counter clockwise to its engaged position, the lip 46 will engage the back side of the stud, resiliently securing the strap within the stud in its engaged position. In the engaged position, the notch 28 fits over the side edge 54 while the notch 36 fits over the top edge of the aperture. As can be understood, the first arm 20 and fourth arm 26 engaged the back side of the stud while the second arm 22 and third arm 24 engage the front side of the stud. By providing a plate with sufficient resiliency, the arms are slightly deflected to provide the resilient force necessary to secure the strap to the stud.

As can best be seen in FIGS. 2-4, the second and third arms can each be provided with an extension 64 which extends in the opposite direction from the plane 48 as the lips 46, 50. These extensions provide a convenient surface for the fingers of the installer to manipulate the strap into the secured position in the stud. Preferably, a flange 66, best seen in FIGS. 2 and 5, is formed about a portion of the cutout 40 to provide a bearing surface of relatively large cross-sectional area to bear on the conduit to resist damage to the conduit.

In one strap constructed in accordance with the teachings of the present invention, the strap was made of galvanized steel having a thickness of 1/32 inch. The height of the strap, dimension A, was 3 inches. The top of notch 28 was 1½ inches from the top edge while the top of the notch 32 was 1⅜ inches from the top edge. The notches are all 0.050 inches wide with notches 28 and 32 3/16 of an inch deep and notch 36 ¼ of an inch deep. The cutout has a 1 inch opening which decreases to a ⅜ inch diameter semicircle. The extensions 64 extend ¼ inch above the plane 48 while the lips extend about 1/32 inch below the plane. The maximum width of the strap is 2 inches while the width between the second and third arms is 1.874 inches. The flange 66 is about ⅛ inch wide. The cutout is about 1 inch deep.

Although the present invention has been described with respect to the specific preferred embodiment thereof, various changes and modifications may be suggested to one of ordinary skill in the art, and it is intended that the present invention encompass such changes and modifications as fall within the scope of the appended claims.

We claim:

1. A strap for bracing conduit passing through a rectangular hole in a metal stud, comprising:
   (a) a generally rectangular sheet of flexible material, adapted to fit within the hole in the metal stud, and having a top edge, a right edge, a bottom edge, a left edge, a front face, and a back face;
   (b) the top edge having a slot dividing it into a top-right tab and a top-left tab;
   the top-right tab running in a direction coincident with the top edge;
   the slot running in a direction approximately perpendicular to the top edge;
   the top-left tab running from the slot downwards at an angle to the left edge, the tab having its uppermost portion bent in a backwards direction such that a permanent displacement exists between the top-right tab and the top-left tab viewed in the plane of the sheet;
   (c) the right edge having a slot dividing it into a right-upper tab and a right-lower tab;
   the right-upper tab running in a direction coincident with the right edge;
   the slot running in a direction approximately perpendicular to the right edge;
   the right-lower tab running in a direction parallel with the right edge, the tab having its rightmost portion bent in a backwards direction such that a permanent displacement exists between the right-upper tab and the right-lower tab when viewed in the plane of the sheet;
   (d) the bottom edge having an indentation dividing it into bottom-right tab and bottom-left tab;
   the bottom-right tab and bottom-left tab running in a direction coincident with the bottom edge;
   the indentation having a width greater then the diameter of the conduit to be braced, the indentation tapering smoothly inwards and having a semicircular upper boundary such that the overall depth of the indention is greater than the diameter of the conduit to be supported.
   (e) the left edge having a slot dividing it into a left-upper tab and a left-lower tab;
   the left-upper tab running in a direction parallel with the left edge, the tab having its leftmost portion bent in a backwards direction such that a permanent displacement exists between the left-upper tab and the left-lower tab when viewed in the plane of the sheet;
   the slot running in a direction approximately perpendicular to the left edge;
   the left-lower tab running in a direction parallel with the left edge, the tab having its leftmost portion bent in a backwards direction such that a permanent displacement exists between the right-upper tab and the right-lower tab when viewed in the plane of the sheet.

2. A strap as recited in claim 1, wherein the composition of said generally rectangular sheet of the flexible material is selected from the group consisting of steel, galvanized steel, stainless steel, brass, bronze and copper.

3. A strap as recited in claim 1, wherein the composition of said generally rectangular sheet of the flexible material is selected from the group consisting of structural plastics, polymers and composites.

4. A method of installing a conduit strap in a metal stud to secure a conduit, the metal stud having a rectangular aperture therethrough, comprising the steps of:
   positioning the conduit strap at a predetermined angle to its final position, the conduit strap including a resilient plate formed of first, second, third and fourth arms, a first notch being formed between the first and second arms on a first side of the plate and a second notch formed in the plate between the third and fourth arms on the plate on second side of the plate;
   positioning the strap over the conduit passing through the aperture in the metal stud and inserting a lip of the fourth arm through the aperture to bear against the back side of the metal stud with an edge of the aperture entering the notch between the third and fourth arms of the strap;
   rotating the strap relative to the metal stud so that a lip formed on the first arm of the strap will pass through the aperture to bear against the back side of the stud, the arms of the strap being deformed as the strap is rotated into the engaged position to tightly engage the strap within the aperture of the metal stud.

* * * * *